United States Patent [19]

Larsen et al.

[11] Patent Number: 4,644,344

[45] Date of Patent: Feb. 17, 1987

[54] ELECTROCHROMIC MATRIX DISPLAY

[75] Inventors: Thor A. Larsen, Woodstock, N.Y.; David H. Martin, Winchester; Frank T. Moth, Eastleigh, both of England

[73] Assignee: International Business Machines Corporation, Armonk, N.Y.

[21] Appl. No.: 681,351

[22] Filed: Dec. 12, 1984

[30] Foreign Application Priority Data

Dec. 29, 1983 [GB] United Kingdom ................ 8334587
Nov. 15, 1984 [EP] European Pat. Off. ........ 84307919.5

[51] Int. Cl.⁴ .......................................... G09G 3/34
[52] U.S. Cl. .................................... 340/785; 340/811
[58] Field of Search ............... 340/718, 719, 781, 784, 340/785, 811, 800; 350/357, 363

[56] References Cited

U.S. PATENT DOCUMENTS

| | | | |
|---|---|---|---|
| 4,082,430 | 4/1978 | Schulthess et al. | 340/784 X |
| 4,281,324 | 7/1981 | Noromura et al. | 340/784 |
| 4,297,695 | 10/1981 | Marshall | 340/785 X |
| 4,346,378 | 8/1982 | Shanks | 340/784 X |
| 4,426,643 | 1/1984 | Martin | 340/785 X |
| 4,429,304 | 1/1984 | Fujita | 340/765 |
| 4,481,511 | 11/1984 | Hanmura et al. | 340/752 |
| 4,499,459 | 2/1985 | Sasaki et al. | 340/811 X |

FOREIGN PATENT DOCUMENTS

| | | |
|---|---|---|
| 3200122 | 7/1982 | Fed. Rep. of Germany . |
| 3641926 | 3/1984 | Switzerland . |
| 2095453 | 9/1982 | United Kingdom . |
| 2098782 | 11/1982 | United Kingdom . |

Primary Examiner—Gerald L. Brigance
Assistant Examiner—Vincent P. Kovalick
Attorney, Agent, or Firm—Roy R. Schlemmer

[57] ABSTRACT

An electrochromic matrix display of the kind in which the display electrodes are supported on a substrate above a corresponding matrix of transistor switches employs constant current writing and potentiostatic erasure. The transistors are switchable by signals applied on respective gate lines to pass electric current on the respective drive lines to their display electrodes. Gate and drive selection means define the active gate and drive lines During erasure, the potentiostatic erase voltage is applied to both ends of the selected drive lines simultaneously to speed up the current limited asynchronous erase operation. Optionally, the display may be driven alternately from opposite ends of the drive lines during a line-by-line writing operation.

6 Claims, 3 Drawing Figures

ELECTROCHROMIC MATRIX DISPLAY

TECHNICAL FIELD OF THE INVENTION

The invention relates to electrochromic matrix displays.

BACKGROUND OF THE INVENTION

Matrix displays in which an image is formed by selective activation of a matrix of display electrodes, each constituting one picture element of the display, are generally addressed by means of orthogonal sets of row and column lines. To display a full range of images, it is necessary to employ time multiplexing techniques and to write such displays one row or column at a time, with the image data to be written on the selected row or column being presented concurrently on the orthogonal set of lines.

Passive matrix addressing, in which the contrast of the picture element is directly determined by the electrical waveforms present on the coordinate row and column lines, is only feasible with certain types of liquid crystal material. Such materials must have a relatively sharp optical transmission characteristic so that an observable contrast difference exists between elements receiving signals on both coordinate lines and elements receiving signals on only one line. Additionally the liquid crystal material must have sufficient persistence or memory to remain in the contrasting state until the whole matrix has been written and a refresh operation can commence.

Many liquid crystals do not have such memory properties and these can only be addressed by means of an active scheme in which each display electrode has an associated transistor switch and storage capacitor. The transistor switch is opened by a signal on one address line to permit charging or discharging of the capacitor to the voltage on the orthogonal address line. If the liquid crystal is of the d.c. driven type, the voltage on the capacitor may be sufficient to control the contrast state of the liquid crystal picture element directly. Such a display is described in an article by K. Kasahara et al., entitled "A liquid-crystal TV display panel" using a MOS array with gate-bus drivers (Conference Record of the 1980 Biennial Display Research Conference, pp 96–101, published by the IEEE). To improve the fabrication process yield, dual gate bus driver arrays are shown but are not used simultaneously. One only is enabled by a switch circuit to limit power consumption.

Another liquid crystal display, using a.c. drive techniques, is described in an article entitled "A pocket sized liquid crystal TV display" by E. Kaneko et al., (S.I.D. '81 Digest pp 84–85). In this case the vertical line drive circuits are split into two with drivers at the top and bottom of the array driving interleaved lines.

If the liquid crystal is not of the d.c. type, as per Kasahara et al, or the a.c. type of relatively low pel density as described in the Kaneko paper the capacitor may be used to control a second transistor which connects a driving waveform, e.g. an a.c. waveform, to the associated liquid crystal display electrode. Such a scheme is discussed in a paper by D. J. Barclay et al., entitled "The Design of Silicon based passive displays" from Electronics to Microelectronics, W. A. Kaiser and W. E. Proebster (Eds.) pp 737–740, published by North Holland). The Barclay et al. paper discusses comparatively the problems of matrix addressing both liquid crystal and electrochromic displays whose display electrodes and addressing circuits are integrated on a silicon chip.

Because an electrochromic display has no well defined contrast threshold, it is necessary to address it by means of the active technique, i.e., via switching transistors connected to each display electrode. However, because of the persistence of the electrochromic effect after removal of the applied write voltage, no storage capacitor is needed and only a single switching transistor is required. Thus the circuit elements associated with each display electrode are much simpler than in the liquid crystal case.

The writing of an electrochromic display is performed similarly to a liquid crystal matrix display, i.e. by one line at a time multiplexing. However, as a well known alternative to voltage driving in electrochromic displays, such as those of the viologen type, where the resulting uncontrolled cathodic potentials at the display electrodes do not run the risk of producing adverse side reactions, constant current writing is preferred. Constant current writing has the advantage of speed and can easily be made synchronous with the line scanning operation since application of current for a fixed interval corresponds to deposition of a fixed charge on the display electrode.

Erasure of electrochromic displays is, however, not analogous to the liquid crystal case. With passively addressed liquid crystal displays the image simply disappears when the applied voltage is removed. Similarly, with actively addressed liquid crystal displays, whenever the voltage across the liquid crystal picture element (pel) is removed, i.e. the charge on the capacitor is removed either actively and rapidly or more slowly by leakage current discharge, the liquid crystal pel image disappears quickly. Electrochromic displays have stored charges of the order of 2 mCcm$^{-2}$ and since the charge is often in the form of a low conductivity physical deposit, leakage is relatively slow.

For this reason, the charge stored on the electrochromic display electrodes must be positively removed by reverse current flow. To achieve this, the technique of potentiostatic erasure is preferred. This technique, which is well known, necessitates a reference electrode in contact with the electrolyte of the electrochromic cell. An erase voltage source monitors the potential of the reference electrode with respect to the solution and develops an erase voltage which is fixed with respect to the reference electrode potential. The erase voltage corresponds to the potential of an unwritten display electrode in solution. It is applied to the display electrodes to be erased and erase current flows to remove the charge on the display electrodes until they, too, are at the erase voltage. The technique has the advantage that display electrodes are not overdriven into undesirable side reactions (e.g., anodisation). This could not be guaranteed with a constant current or even a constant voltage technique. Addressing for erasure is simplified by use of the potentiostatic technique because no harm is done if unwritten electrodes are connected to the erase voltage source. This enables block erasure of part or the whole of the display by selection of multiple lines from each of the orthogonal sets. Line-by-line multiplexing is not necessary.

One such electrochromic matrix display employing constant current writing and potentiostatic erasure is shown in U.S. Pat. No. 4,426,643. This shows a viologen based display in which the display electrodes, a matrix of transistor switches row and column addressing lines and drive circuitry are all integrated on a silicon chip. Row selection information is fed into a row select shift register the outputs of which cause an array of row drivers to drive the selected rows to gate "on" the transistor switches of those rows. Similarly, column selection information representing one line of image data is shifted into a column shift register. An associated column driver array is responsive to the contents of the column shift register to apply either write or erase current to the selected column lines.

Another similar electrochromic matrix display is shown in copending U.S. application Ser. No. 626,505. This application shows a technique of monitoring the total erase current flow in the potentiostatic erase operation and providing an indication that erasure is complete after the erase current has fallen sharply to zero. In this way, excessive worst-case times, sufficient to allow erasure of a complete screen with every electrode written, need not be allowed for the completion of the essentially asynchronous potentiostatic erase process. Instead an "erase complete" signal produced at the actual completion of each particular erase operation allows the next display operation to proceed.

DISCLOSURE OF THE INVENTION

The time taken for potentiostatic erasure of an electrochromic matrix display is a significant performance constraint. Maximum erase time for a given block, if every electrode in the block has been written, approaches the time taken to write the block initially one line at a time. This is because the erase current is determined by the erase voltage and the resistance of the addressing line in which the erase current flows. If more than one electrode on a given line requires erasing, which is very likely to be the case in a block erase operation, then the charge which must be passed is increased in proportion to the number of electrodes in a written state. Since the erase current is limited, the time taken to complete the erasure is also in direct proportion to the number of written electrodes on the line.

Accordingly the invention provides an electrochromic matrix display having an electrochromic cell enclosing a matrix of display electrodes, an electrolyte, a counter electrode and a reference electrode for sensing the potential of the electrolyte, the display electrodes being supported on a substrate above a corresponding matrix of transistor switches located at the intersections of a plurality of gate lines and a plurality of drive lines; the display further comprising gate selection means for defining a selection of gate lines and drive selection means for defining a selection of drive lines, the selection means being cooperable to define a selection of transistor/display electrode pairs, each transistor having a control electrode and being switchable by a signal applied to its control electrode on the respective gate line to pass electric current on the respective drive line to its corresponding display electrode, a write current source, means for selectively applying write current from the source to the defined selection of drive lines to write the display electrodes selected by the two selection means, an erase voltage source arranged to develop an erase voltage which is fixed with respect to the reference electrode potential, means for selectively applying the erase voltage to selected drive lines whereby display electrodes selected by the two selection means are driven potentiostatically to the erase voltage potential by flow of erase current on the selected drive lines, the display being characterized in that the means for selectively applying the erase voltage is arranged to apply the erase voltage to both ends of the selected drive lines simultaneously.

By connecting the erase voltage to both ends of the selected drive lines simultaneously, up to four times the current flow is achieved and the average erase time is approximately quartered. Because of the effectively parallel connection, the maximum resistance of the drive line to the most remote electrode is reduced to one quarter of the maximum resistance if the erase current were applied at one end only.

Although in the above referenced prior art, dual drivers have been shown for liquid crystal matrix displays, these have not been employed to drive the same lines simultaneously. Either interleaved sets of lines have been driven or one redundant set of drivers has been provided for manufacturing yield reasons only and is disabled in operation.

It should be realized that although conventionally, the gate lines would be row lines and the drive lines would be column lines there is no reason which these functions could not be interchanged.

Where, as in the preferred implementation of such a display, the substrate is a semiconductor substrate in which the matrix of transistors is integrated, at least the drive lines being formed as conductive diffusions in the substrate, the invention is especially beneficial because of the relatively high resistance of diffused lines.

In a preferred embodiment of the invention, the drive selection means comprises two selection registers at opposite ends of the drive lines each of which is capable of defining a complete selection of lines. In this case the means for selectively applying the erase voltage is selectively operable to connect the erase voltage simultaneously to first and second groups of switches at opposite ends of the drive lines. The switches are responsive to the contents of respective selection registers to connect the erase voltage to an identical selection of drive lines.

Clearly, other arrangements can be contemplated. For example, only a single selection register may be needed if the drive lines are always driven identically from both ends. Also although a register such as a shift register, is preferred for defining the selection of lines, a decoder could be employed instead.

When writing, there is no real advantage in connecting the constant write current to both ends of the drive lines simultaneously since the maximum permissible current is predetermined by the physical structure of the address lines and the transistor matrix and also is constrained by the electrochemical properties of the display. It is therefore preferred that the write current is connected to one only of the groups of drive line switches at a time.

This allows the freedom to apply the write current alternately to each group of drive line switches. With the preferred writing method in which the gate selection means is arranged to select one gate line at a time for writing, the state of the display electrodes in the selected line is determined alternately by the contents of the two drive selection registers. Thus one selection register can be loaded with data for the next line to be written while the other register controls writing of the current line.

BRIEF DESCRIPTION OF THE DRAWINGS

The invention will now be described further, by way of example only, with reference to the following drawings, in which.

DETAILED DESCRIPTION

Figure 1:
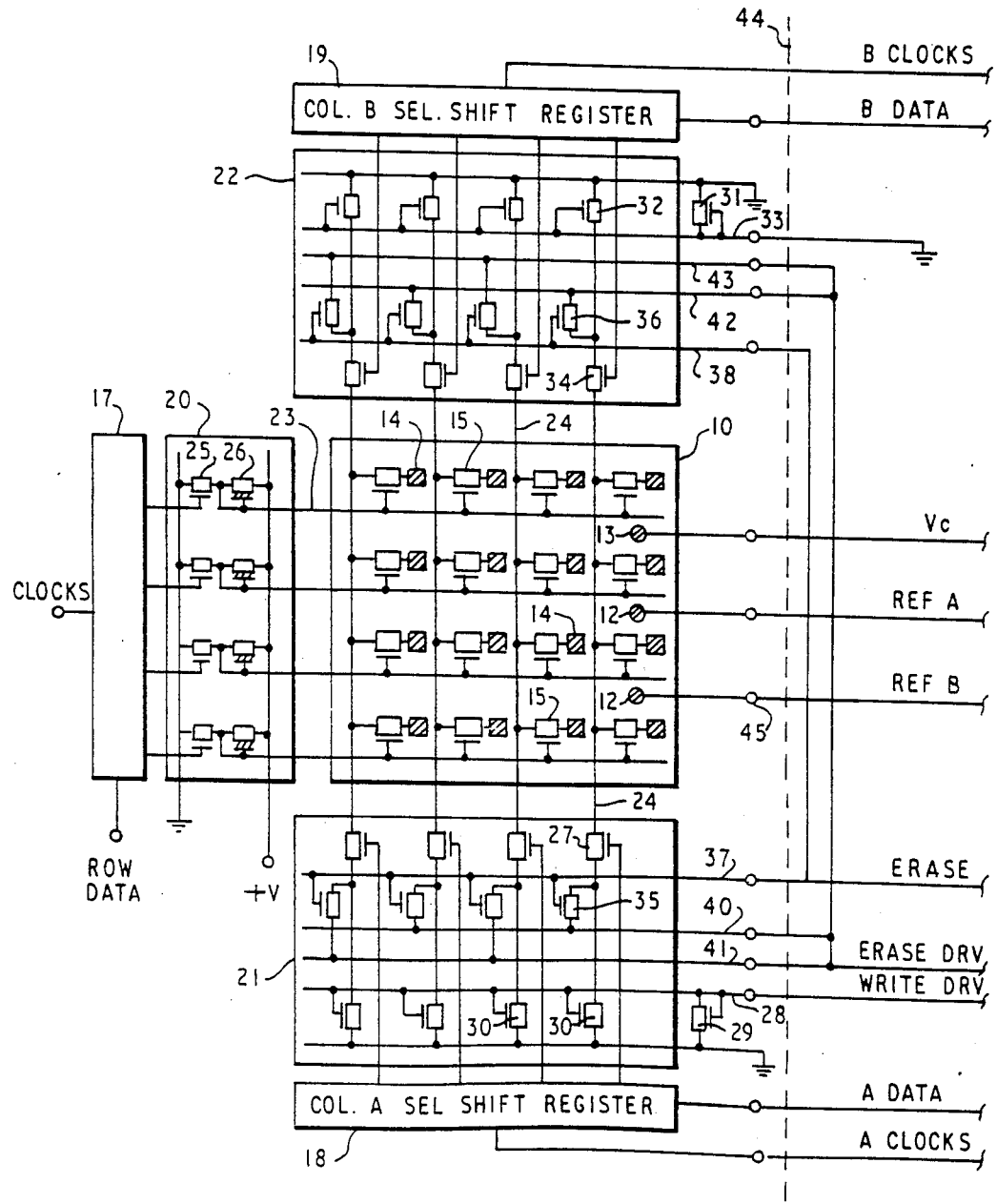
FIG. 1 shows schematically an electrochromic matrix display according to the present invention and associated integrated circuitry.

The display of FIG. 1 comprises a sealed cell 10 containing an aqueous solution of an electrochromic substance, such as viologen. A preferred solution contains a mixture of 1,1' di-heptyl-4,4' bipyridinium phosphate and hypophosphite, together with thallium ions, as described in European patent application, publication No. 0083668-A1. Within the cell are dual reference electrodes 12, a platinum black counter electrode 13, connected to a source of potential $V_c$, and an array of identical matt silver display electrodes 14, each constituting one picture element of the display. For ease of illustration only sixteen display electrodes are shown, arranged in a four by four array. In practice a much larger number would be employed.

The electrodes 14 are formed over a corresponding array of field effect transistors 15 and each electrode is electrically connected to the drain of an associated FET 15 by via metallurgy. The FET's are themselves formed on a silicon substrate (not shown) and overlaid with inorganic and organic passivation layers. A method of fabrication of such a display in conventional N-channel FET technology is described in copending U.S. application Ser. No. 560,051 (also published as European patent application; publication No. 0112417-A1).

The write and erase operations of the display cell 10 are controlled by associated display drive circuits in response to externally supplied control signals. The write operation is a constant current process and the erase operation is potentiostatic, as described in general terms above.

As described in connection with FIG. 2, the dual electrodes 12 alternately cycle between "reference" and "refresh" modes under control of a reference control circuit. The control circuit ensures that one of these two electrodes is always in the reference mode in which it is coated with sufficient viologen to stabilize its potential with respect to the solution. While one of the electrodes 12 is in the reference mode the other is being erased and rewritten. The erasure of the electrodes to be refreshed is desirable so that the amount of viologen subsequently rewritten can be accurately controlled.

Returning now to FIG. 1, each of the electrodes 14 may be individually selected for writing by means of its associated FET 15 which behaves as a switch. The individual electrodes are identified by means of row and column data loaded into row shift register 17 and dual column shift registers 18 and 19. The row shift register controls associated row driver 20 and column shift registers 18 and 19 control column drivers 21 and 22 to activate selected row and column lines 23 and 24 connected to the gates and sources respectively of the FET matrix. Thus if a row line 23 is activated, the row of FET's is gated on to connect the electrodes 14 of the row to any write or erase currents flowing on column lines 24.

The row lines 23 are aluminium but the column lines 24 are conductive diffusions in the silicon substrate.

The row drive circuit 20 comprises a string of transistor pairs, such as enhancement mode device 25 and depletion mode device 26, each associated with one stage of the shift register 17. These two devices form a line driving inverter which isolates the shift register circuit from the loading of the row select line. The function of the row lines is essentially a gating function.

The column driver 21 is slightly more complicated in that it has to provide both erase and write current to the line 24. Connection of a line 24 for either operation is by means of a transistor switch 27 operated in accordance with the contents of an associated shift register stage.

The write operation is selected by applying a reference current WRITE DRIVE A on a write line 28 to the gate of a transistor 29. This causes transistor 29 to behave as a constant current source, drawing a current, $I_w$. A number of transistors 30, also gated by line 28, act as current mirrors. Thus, if a selection transistor 27 is on, a constant current, $I_w$, will be drawn from the associated column line 24. The writing process is such that the display is written one row at a time so that only a single FET 15 in any column can be on at any given time.

The current source and mirrors are duplicated in column driver 22 by transistors 31 and 32, and provision is made for a similar signal WRITE DRIVE B to be applied on line 33. However, in the illustrated arrangement of FIG. 1, WRITE DRIVE B is not applied. Instead line 33 is grounded, as shown by the dotted line connection, and the duplicate circuit is not used.

The potentiostatic erase process is also controlled by the row and column drivers and can be a block operation. In other words all display electrodes, both written and unwritten, in an area to be erased are selected by loading the row select and column select shift registers with the appropriate data pattern. In this case, both column drivers 21 and 22 are active. Transistor switches 27 and duplicate transistor switches 34 are gated "on" in accordance with the contents of their respective shift registers.

If an externally generated "ERASE" signal is applied to the gates of further rows of transistors 35 and 36 on lines 37 and 38 then the potentiostatic erase voltage, ERASE DRIVE applied to these transistors, is connected simultaneously to opposite ends of the selected column lines 24. The potentiostatic erase voltage is generated from the solution potential sensed by reference electrodes 12 by an offset amplifier in the reference control circuit as described in the above referenced U.S. Pat. No. 4,426,643. The amplifier behaves as a voltage source and provides whatever current is necessary to maintain its output at a fixed potential offset from the operative reference electrode. Because the potentiostatic erase process is self limiting, no damage results from the selection and connection of unwritten as well as written display electrodes to the erase potential.

The erase voltage, ERASE DRIVE, is applied to the column drivers 21 and 22 on pairs of lines 40, 41 and 42, 43 which are connected alternately to the transistors of rows 35 and 36. This alternate connection scheme has no operational significance and is provided purely to enable testing of the display.

The circuit components thus far described and shown to the left of the dashed line 44 in FIG. 1 are all, except for the counter electrode 13, integrated on the silicon substrate. External electrical connection is made by means of pads, such as 45, on a terminal portion of the substrate which projects beyond the sealed portion of the cell 10. An external printed connector card has the effect of making common certain of the integrated lines as indicated by the connections to the right of the dashed line in FIG. 1.

Thus it can be seen that only a single "ERASE" signal is provided to lines 37 and 38 of the dual drivers 21 and 22 and the common erase voltage signal, ERASE DRIVE, is provided to all four of the lines 40–43. Although, for the mode of operation of the display as thus far described, the inputs to the Column A and Column B shift registers 18 and 19 could be common, greater flexibility is achieved by keeping the inputs independent and, during normal erase operations, loading the two registers with identical data.

Figure 2:
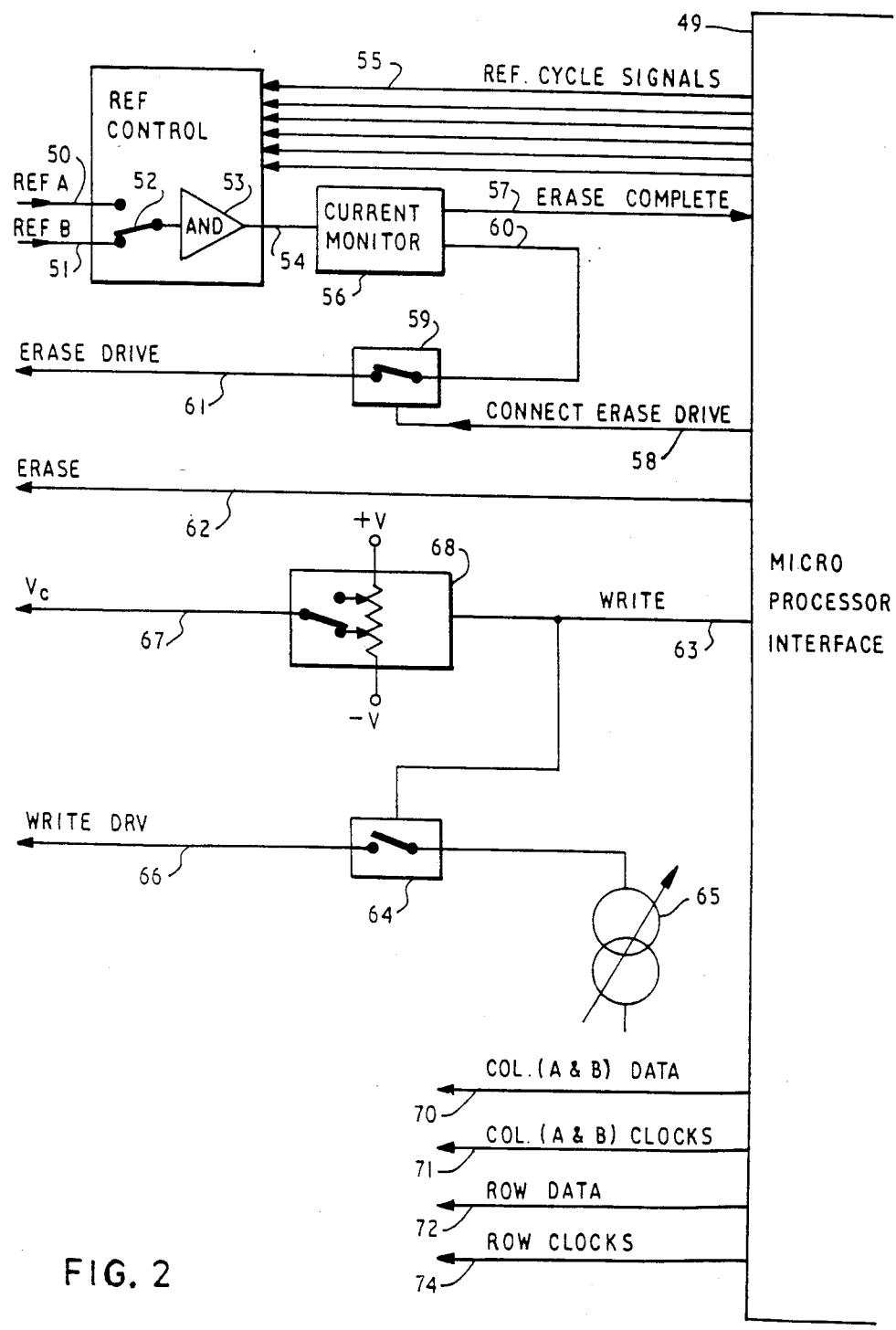
FIG. 2 shows schematically a microprocessor interface and support circuit for the display of FIG. 1.

In fact, in the configuration formed by combining the display and circuitry of FIG. 1 with the interface and support circuit of FIG. 2, the two registers are also loaded identically during write operations. However, because line 33 is externally connected to ground, no write current is available in the upper driver 22 which remains inoperative.

The ERASE and ERASE DRIVE signals applied on lines 37 and 41 in FIG. 1 are produced, as shown in FIG. 2, by a combination of off-chip support circuitry and a microprocessor interface 49. The ERASE DRIVE signal, which is the potentiostatic erase voltage, is derived alternately from the two reference electrodes 12. The potentials REF A and REF B from these two electrodes are applied on lines 50 and 51 to a schematically indicated switch 52. Switch 52 always connects one of the reference electrodes to an offset amplifier 53 whose output is maintained at a predetermined voltage difference from the potential of the connected reference electrode. Thus the amplifier 53 behaves as a voltage source and provides erase current on line 54.

The reference electrodes are themselves cycled through write and erase operations under the control of signals on lines 55 so as to ensure that a stable reference potential is always available at switch 52. A detailed description of such reference electrode cycling is given in U.S. Pat. No. 4,426,643, the only difference here being that the reference cycle signals are provided by the microprocessor interface 49.

The flow of erase current on line 54 is monitored by current monitor circuit 56 as described further in U.S. application Ser. No. 626,505. When the current falls sharply towards zero indicating that the potentiostatic erase process is complete, an ERASE COMPLETE signal is produced on line 57 and fed back to microprocessor interface 49 which is then free to commence the next display application.

The signal ERASE is produced by the microprocessor interface on line 62 when an erase operation is to take place provided that, after power was first supplied to the display, an initial reference electrode writing cycle controlled by lines 55 to ensure the initial availability of a stable reference has been completed. The same conditions are also sufficient to cause the microprocessor 49 to provide the signal CONNECT ERASE DRIVE to a switch 59, allowing erase current, emerging from the current monitor on line 60 to be applied to the display on line 61 as the signal ERASE DRIVE.

The write operation is initiated in response to a signal, WRITE, from the interface 49 on line 63. This closes a switch 64 to connect a constant current source 65 to a line 66, thereby to apply the write reference current signal, WRITE DRIVE A, to the display.

The WRITE signal also controls the potential, $V_c$, applied to the counter electrode on line 67 by means of counter electrode control circuit 68, schematically shown as a two-tap potentiometer. To accommodate resistive drops in the electrolyte and display chip, without limiting current, the counter electrode voltage is raised during a write operation and lowered when not writing.

Finally, the data and clocks for the row shift register 17 and column shift registers 18 and 19 are provided directly from the microprocessor interface 49 on lines 70–74.

The independence of the upper and lower column select and drive arrangements allows them to be used alternately during line by line writing of the display. In this case, line 33 would not be grounded but would be connected to receive a reference write current. While a row selected by row select shift register was being written in accordance with data stored in column A register 18, the column B register is loaded by the microprocessor with data to be written in the next line.

Figure 3:
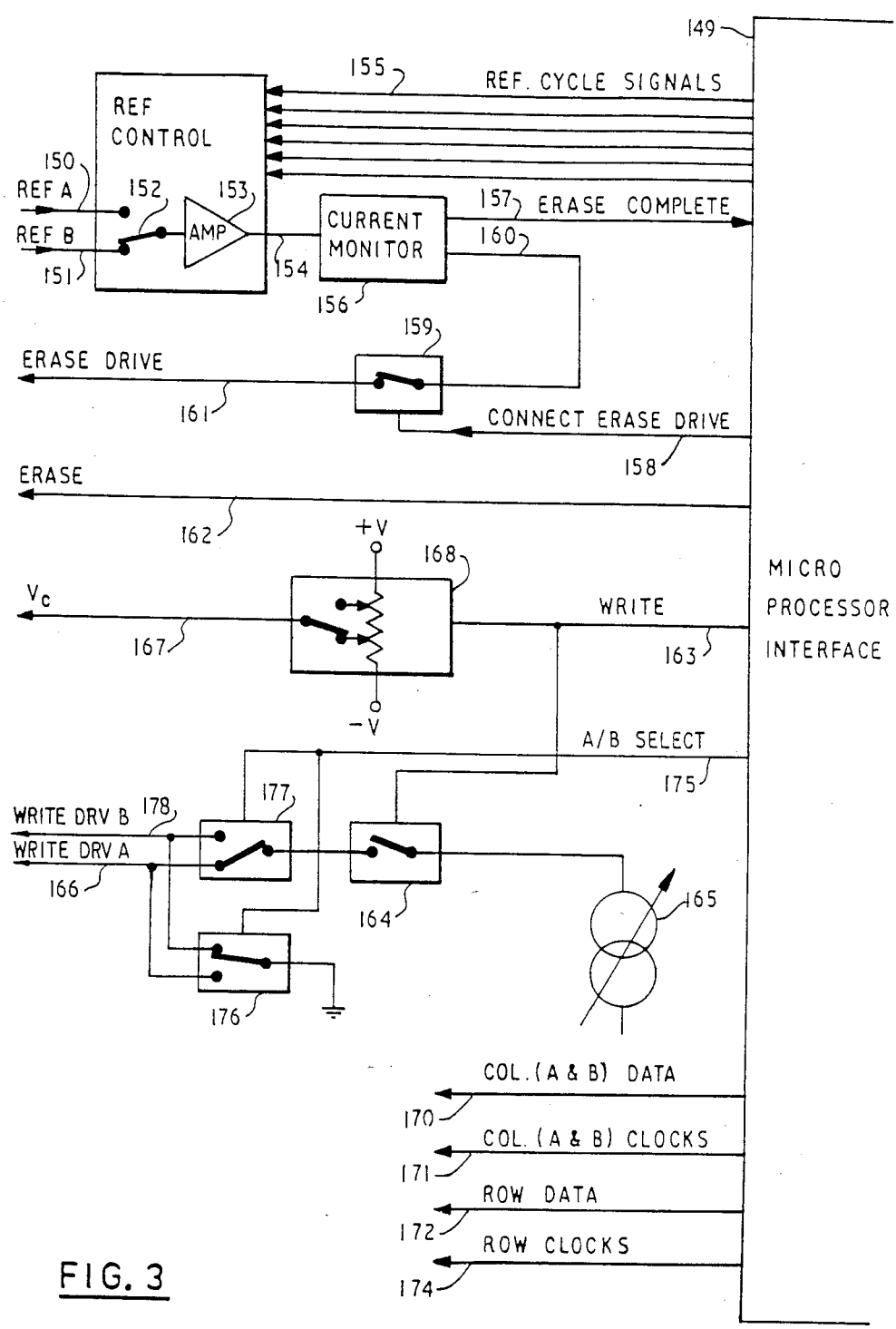
FIG. 3 shows schematically an alternative microprocessor interface and support circuit for the display of FIG. 1.

Such an arrangement is formed by the combination of the display and circuitry of FIG. 1 with the modified interface and support circuit of FIG. 3. In this arrangement, line 33 is no longer grounded but is connected to receive a reference write current WRITE DRIVE B.

Identical portions of FIGS. 2 and 3 are numbered similarly i.e. the reference numerals differ by one hundred. The common portions of FIGS. 2 and 3 will not be further explained.

The difference between FIGS. 2 and 3 lies in the provision of an additional output line 175 from the microprocessor 149 interface and in the provision of a pair of switches 176 and 177 whose outputs are the two reference currents WRITE DRIVE A and WRITE DRIVE B. When the data on line 170 has been loaded into the a shift register 18, FIG. 1, a signal A/B SELECT on line 175 causes the reference current pulse to appear on the WRITE DRIVE A line 166 via switch 177. The same signal A/B SELECT also causes the WRITE DRIVE B line 178 to be grounded via switch 176.

Thus, as data is switched on alternate cycles from one column register to another, the WRITE DRIVE current is also switched between the two column drivers 21 and 22 in antiphase with the data loading operation.

We claim:

1. An electrochromic matrix display having an electrochromic cell enclosing a matrix of display electrodes, an electrolyte, a counter electrode and a reference electrode for sensing the potential of the electrolyte, the display electrodes being supported on a substrate above a corresponding matrix of transistor switches located at the intersections of a plurality of gate lines and a plurality of drive lines;

the display further comprising gate selection means for defining a selection of gate lines and drive selection means for defining a selection of drive lines, the gate and drive selection means being operable to define a selection of transistor/display electrode pairs, each transistor having a control electrode and being switchable by a signal applied to its control electrode on the respective gate line to pass electric current on the respective drive line to its corresponding display electrode, a write current source, means for selectively applying write current from the source to the defined selection of drive lines to write the display electrodes selected by the gate and drive selection means, an erase voltage source arranged to develop an erase voltage which is fixed with respect to the reference electrode potential, means for selectively applying the erase voltage to selected drive lines whereby display electrodes selected by the gate and drive selection means are driven potentiostatically to the erase voltage potential by flow of erase current on the selected drive lines, the display being characterized in that the means for selectively applying the erase voltage is arranged to apply the erase voltage to both ends of the selected drive lines simultaneously.

2. A display as claimed in claim 1 in which the substrate is a semiconductor substrate in which the matrix of transistors is integrated, and wherein the drive lines connected thereto are formed as conductive diffusions in the substrate.

3. A display as claimed in claim 2 in which the drive selection means and the gate selection means are also integrated.

4. A display as claimed in claim 1 in which the drive selection means comprises a selection register at each end of the drive lines, each capable of defining a complete selection of lines, and in which the means for selectively applying the erase voltage is selectively operable to connect the erase voltage simultaneously to first and second groups of switches at opposite ends of the drive lines, the switches of each group being responsive to the contents of respective selection registers to connect the erase voltage to an identical selection of drive lines.

5. A display as claimed in claim 4 in which the means for selectively applying the write current is selectively operable to connect the current to only one of the first and second groups of switches at a time, the switches of the connected group being responsive to the contents of the respective selection register to connect write current to the selection of drive lines defined by that register.

6. A display as claimed in claim 5 in which the gate selection means is arranged to select one gate line at a time for writing, the state of the display electrodes in the selected line being determined alternately by the contents of the two drive selection registers, the means for selectively applying the write current being alternately operable to connect write current to the corresponding group of drive line switches.

* * * * *